(12) United States Patent
Santoro et al.

(10) Patent No.: US 12,161,951 B2
(45) Date of Patent: Dec. 10, 2024

(54) DEAERATOR

(71) Applicant: Spirax-Sarco Limited, Cheltenham (GB)

(72) Inventors: Aldo Santoro, Nova Milanese (IT); Luca Palma, Nova Milanese (IT); Daniele Carbone, Nova Milanese (IT)

(73) Assignee: Spirax-Sarco Limited, Cheltenham (GB)

( * ) Notice: Subject to any disclaimer, the term of this patent is extended or adjusted under 35 U.S.C. 154(b) by 314 days.

(21) Appl. No.: 17/621,004

(22) PCT Filed: Jun. 20, 2020

(86) PCT No.: PCT/EP2020/067262
§ 371 (c)(1),
(2) Date: Dec. 20, 2021

(87) PCT Pub. No.: WO2020/254674
PCT Pub. Date: Dec. 24, 2020

(65) Prior Publication Data
US 2022/0323883 A1    Oct. 13, 2022

(30) Foreign Application Priority Data

Jun. 20, 2019 (EP) .................................... 19425044

(51) Int. Cl.
*B01D 19/00* (2006.01)
*C02F 1/20* (2023.01)
*C02F 101/10* (2006.01)

(52) U.S. Cl.
CPC ....... *B01D 19/0015* (2013.01); *B01D 19/001* (2013.01); *B01D 19/0047* (2013.01); *C02F 1/20* (2013.01); *C02F 2101/10* (2013.01)

(58) Field of Classification Search
CPC ... B01D 19/00; B01D 19/001; B01D 19/0015
See application file for complete search history.

(56) References Cited

U.S. PATENT DOCUMENTS

| 1,785,983 | A | 12/1930 | Sebald |
| 4,265,167 | A | 5/1981 | Mojonnier et al. |
| 4,543,219 | A | 9/1985 | Yamato et al. |
| 4,759,315 | A | 7/1988 | Chiou et al. |
| 10,272,355 | B2 * | 4/2019 | Overmyer ............. B01D 3/002 |

(Continued)

FOREIGN PATENT DOCUMENTS

| AU | 2013200654 A1 | 9/2013 |
| CN | 203043634 U | 7/2013 |
| CN | 203609926 U | 5/2014 |

(Continued)

OTHER PUBLICATIONS

Dec. 20, 2019—(EP) Search Report—App. No. 19425044.5.

(Continued)

*Primary Examiner* — Robert A Hopkins
(74) *Attorney, Agent, or Firm* — Banner & Witcoff, Ltd.

(57) ABSTRACT

A deaerator includes a vessel having a chamber defined by an outer wall; and a tray module detachably connected to the vessel, the tray module having a plurality of deaerator trays which are connected to one another in a spaced relationship to form a stack which is suspended within the chamber.

19 Claims, 3 Drawing Sheets

(56) References Cited

U.S. PATENT DOCUMENTS

2017/0304743 A1    10/2017   Fischer et al.

FOREIGN PATENT DOCUMENTS

| | | |
|---|---|---|
| CN | 104368175 A | 2/2015 |
| CN | 104722105 A | 6/2015 |
| CN | 109236658 A | 1/2019 |
| EP | 3375505 A1 | 9/2018 |
| GB | 494599 A | 10/1938 |
| JP | H06269768 A * | 9/1994 |
| NL | 7109298 A | 1/1973 |
| WO | 2019006555 A1 | 1/2019 |

OTHER PUBLICATIONS

Sep. 25, 2020—(WO) International Search Report and Written Opinion—App. No. PCT/EP2020/067262.
Jul. 7, 2021—(EP) Search Report—App. No. 19425044.5.
Feb. 24, 2023—(CN) Office Action—App 2020800453005 (with trans).

* cited by examiner

DEAERATOR

CROSS-REFERENCE TO RELATED APPLICATIONS

This application is a U.S. National Stage Application under 35 U.S.C. § 371 of International Application No. PCT/EP2020/067262, filed Jun. 20, 2020, which claims the benefit of priority to European Patent Application No. EP 19425044.5, filed Jun. 20, 2019, and the present application claims priority to and the benefit of the filing date of both of these prior applications, which are incorporated by reference herein in their entireties.

TECHNICAL FIELD

The invention relates to a deaerator in which a tray module is suspended within a chamber.

BACKGROUND

Deaerators are used to remove oxygen and other dissolved gases from water. In particular, deaerators may be used to remove oxygen and carbon dioxide from feedwater used in boilers in order to prevent corrosion within the boiler. However, deaerators themselves are also susceptible to corrosion.

It is therefore desired to provide a deaerator that is less susceptible to corrosion.

BRIEF SUMMARY

According to an aspect of the invention, there is provided a deaerator comprising: a vessel having a chamber defined by an outer wall; and a tray module detachably connected to the vessel, the tray module comprising a plurality of deaerator trays which are connected to one another in a spaced relationship to form a stack which is suspended within the chamber; wherein the trays are connected by a plurality of elongate elements which extend between and through the trays; and wherein spacers are received between adjacent trays in order to space them from one another.

The plurality of trays may be suspended from a flange which is supported by the outer wall.

The flange may be disposed between the outer wall of the vessel and a top cap.

The spacers may be formed as sleeves, the elongate elements extending through the sleeves between adjacent trays.

The elongate elements may be rods.

The tray module may further comprise an inner sleeve which is received by the outer wall, wherein the stack of trays is disposed within the inner sleeve.

The inner sleeve may be connected to and extends from the flange.

There may be no direct physical connection between the trays and the outer wall or the inner sleeve.

Each of the trays may be a circular segment.

The tray module may further comprise a base member which forms part of the stack.

The base member may comprise holes for receiving steam and/or holes for expelling deaerated water.

The base member may comprise an upstand and a rim extending radially from the upstand, wherein a plurality of holes are provided on the upstand for receiving steam and a plurality of holes are provided on the rim for expelling deaerated water.

The portion of the vessel in which the tray module is suspended may form a head section and the vessel may further comprise a receiving section which is configured to receive deaerated water from the head section.

The receiving section may comprise a steam generator.

According to a second aspect, there is provided a deaerator comprising: a vessel having a chamber defined by an outer wall; and a tray module detachably connected to the vessel, the tray module comprising a plurality of deaerator trays which are connected to one another in a spaced relationship to form a stack which is suspended within the chamber; wherein the tray module further comprises a base member which forms part of the stack; and wherein the base member comprises an upstand and a rim extending radially from the upstand, wherein a plurality of holes are provided on the upstand for receiving steam and a plurality of holes are provided on the rim for expelling deaerated water.

The plurality of trays may be suspended from a flange which is supported by the outer wall. The flange may be disposed between the outer wall of the vessel and a top cap.

The tray module may further comprise an inner sleeve which is received by the outer wall, wherein the stack of trays is disposed within the inner sleeve. The inner sleeve may be connected to and extend from the flange.

There may be no direct physical connection between the trays and the outer wall or the inner sleeve.

Each of the trays may be a circular segment.

The portion of the vessel in which the tray module is suspended may form a head section. The vessel may further comprise a receiving section which is configured to receive deaerated water from the head section.

The receiving section may comprise a steam generator.

DESCRIPTION OF THE DRAWINGS

For a better understanding of the invention, and to show more clearly how it may be carried into effect, reference will now be made, by way of example, to the accompanying drawings, in which.

DETAILED DESCRIPTION

Figure 1:
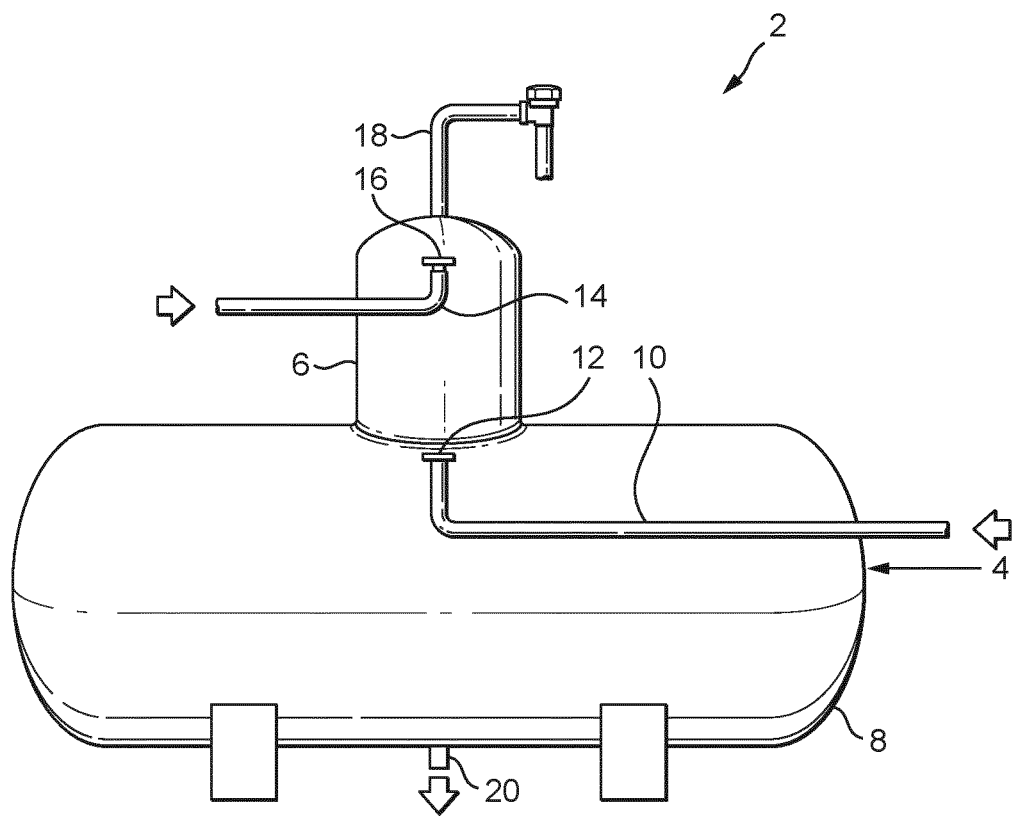
FIG. 1 is a schematic diagram of a deaerator.

FIG. 1 shows a deaerator 2 which comprises a vessel 4 that defines a head section 6 and a receiving section 8 (i.e. storage tank) that are fluidically connected to one another.

The deaerator 2 further comprises a steam supply line 10 which terminates at a steam inlet 12 that opens into the head section 6 of the vessel 4 at its lower (proximal) end, adjacent the receiving section 8. A water supply line 14 is also provided which passes into the head section 6 of the vessel 4 and terminates at a water inlet 16 that is located at or towards an upper (distal) end of the head section 6. A vent 18 is provided at the top of the head section 6 and a water outlet 20 is provided at the bottom of the receiving section 6.

Figure 2:
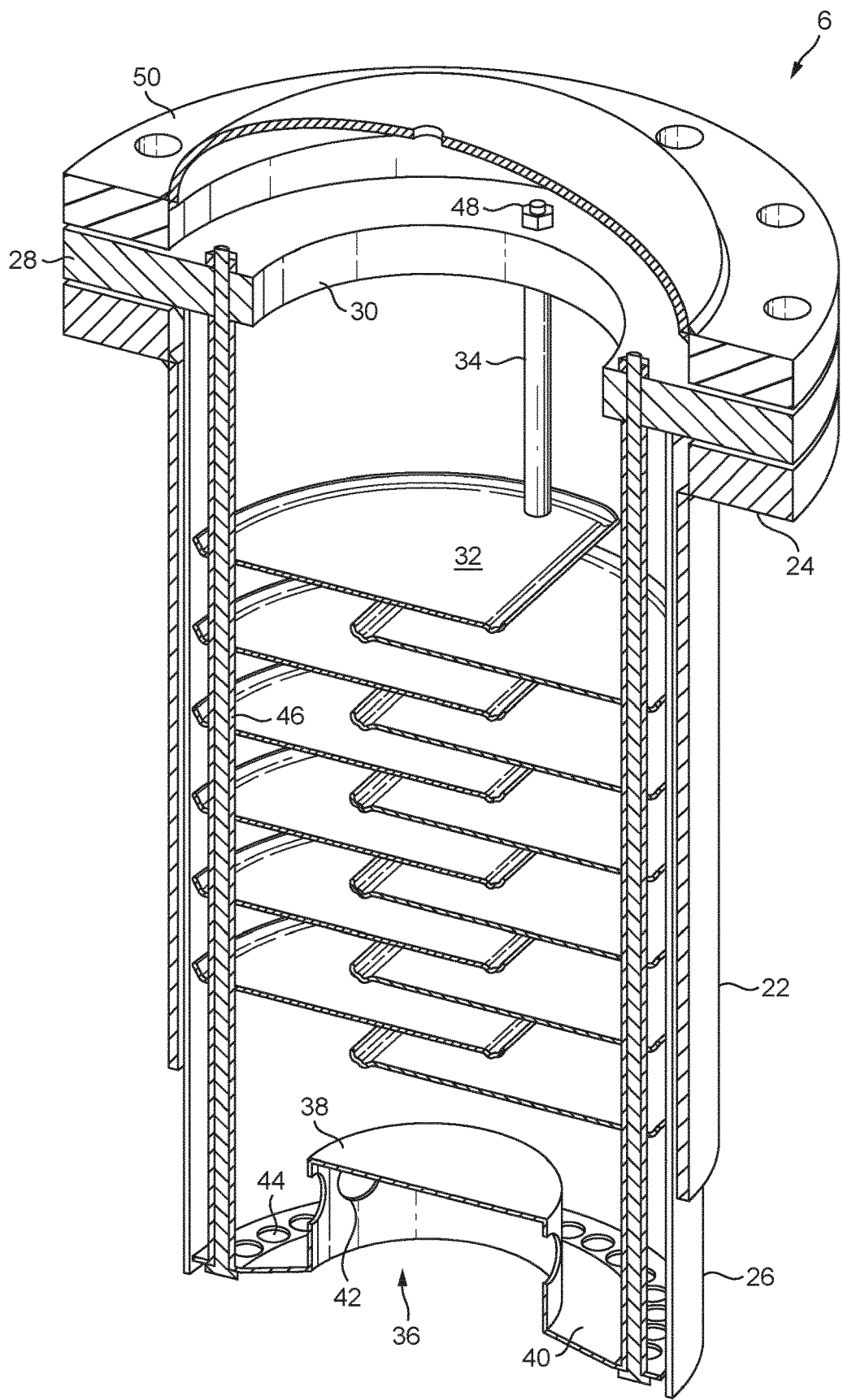
FIG. 2 is a cross-sectional view of a head section of the deaerator.
Figure 3:
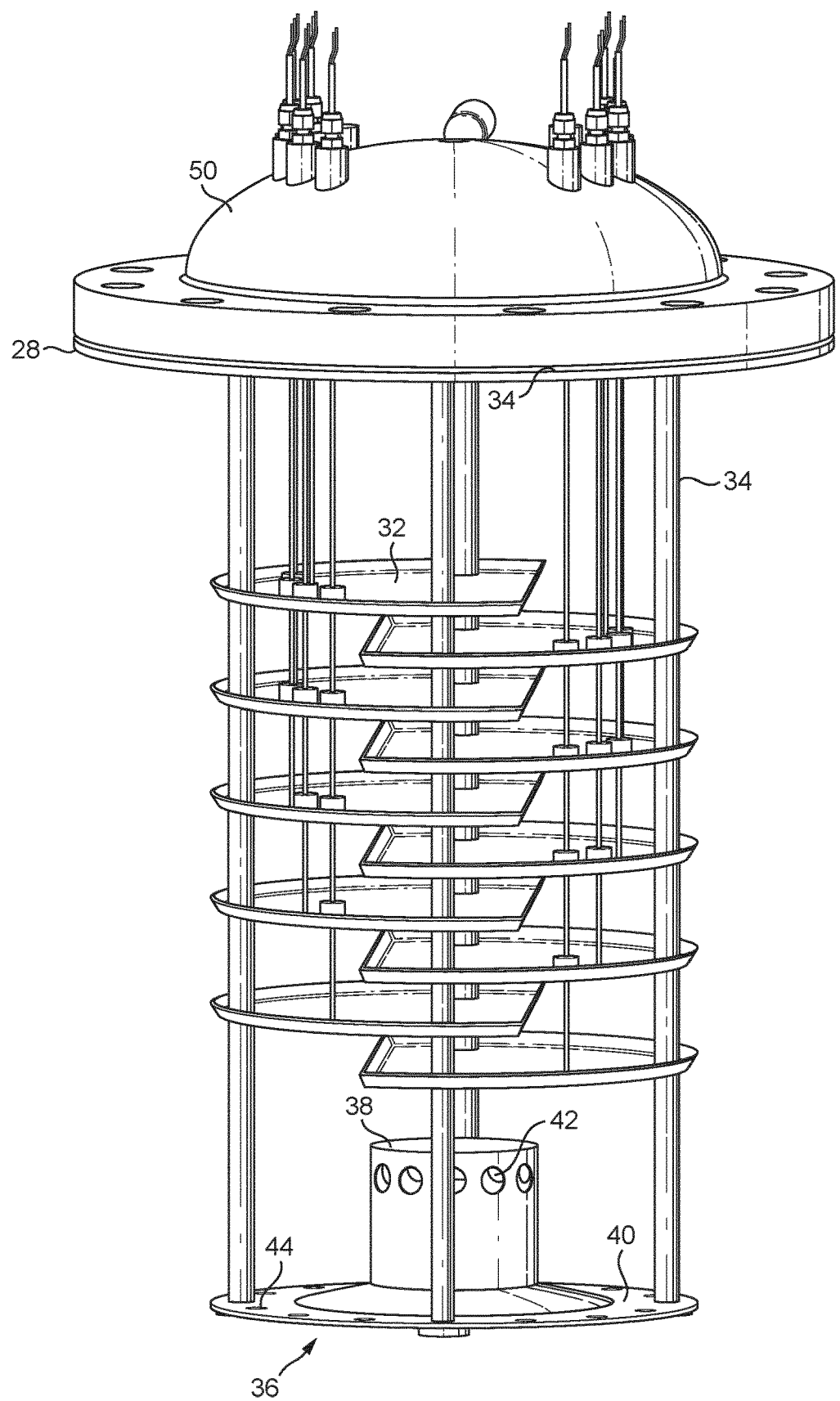
FIG. 3 is a perspective view of a tray module.

FIGS. 2 and 3 show the head section 6 of the vessel 4 in further detail. The head section 6 is formed by an outer wall 22 which may be integral with or detachably connected to an outer wall of the receiving section 8. The outer wall 22 is cylindrical forming a chamber therewithin and is provided with a flange 24 at its upper end.

The outer wall 22 forms a housing which receives an inner sleeve 26. The inner sleeve 26 is cylindrical and sized to fit within the inside diameter of the outer wall 22. The inner sleeve 26 is provided with a flange 28 at one end which rests on the flange 24 of the outer wall 22 to support the inner sleeve 26 within the outer wall 22. The flange 28 extends inwardly of the inner sleeve 26 to form a rim portion 30.

As shown, the inner sleeve 26 may have a length which is greater than that of the outer wall 22 such that the inner sleeve 26 extends partially into the receiving section 8.

A plurality of trays 32 (also referred to as baffles) are disposed within the inner sleeve 26. The trays 32 are suspended from the rim portion 30 of the flange 28 by a plurality of rods 34. The rods 34 extend in a longitudinal direction along the length of the inner sleeve 26 and support the trays 32 such that they are parallel, but spaced from one another in the longitudinal direction, as will be described further below.

As best shown in FIG. 3, each tray 32 is shaped as a segment of a circle which substantially corresponds to the inner diameter of the inner sleeve 26. Adjacent trays 32 are diametrically opposed to one another and thus the trays 32 are arranged in an alternating manner. Each tray 32 represents a circular segment which exceeds a semicircle such that adjacent trays partially overlap at the centre of the inner sleeve 26. The trays 32 therefore form two opposing sets which are interleaved or interdigitated with one another. A raised lip is provided around the perimeter of each tray 32.

The rods 34 carry a base member 36 at their lower ends. The base member 36 has a central upstand 38 and a rim 40 which extends radially outward from the upstand 38. The base member 36 thus has the form of a top hat. A plurality of holes 42 are formed around a circumference of the upstand 38 (i.e. in an axially extending wall) and a plurality of holes 44 are formed around the rim 40. The holes 42 form an inlet for steam into the head section 6, whereas the holes 44 form an outlet for deaerated water from the head section 6 to the receiving section 8.

A portion of the rim 40 is angled downwards towards the holes 42 in order to guide water radially outwards away from the upstand 38 and towards the holes 42.

As described previously, the trays 32 (and the base member 36) are suspended within the inner sleeve 26 by the rods 34. The trays 32 are spaced from one another and from the base member 36 by a plurality of spacer sleeves 46 which are received over the rods 34 and sit between the trays 32 (or base member 36). The spacer sleeves 46 abut against upper and lower surfaces of the trays 32. The lengths of the spacer sleeves 46 are selected to provide the desired spacing between the trays 32.

In the example shown, four rods 34 are provided which are spaced equally around the circumference of the rim portion 30. Two diametrically opposed rods 34 support only one of the sets of opposing trays 42, whereas the other two diametrically opposed rods 34 support both of the sets of opposing trays in an alternating arrangement. Accordingly, different length spacer sleeves 46 may be used to provide the required spacing at each rod 34.

The base member 36 and the trays 32 can therefore be stacked onto the rods 34 with the required spacer sleeves 46 therebetween and then the rods 34 can be affixed to the rim portion 30. In particular, each of the rods 34 may comprise a threaded portion at its end which receives a nut 48. The nut 48 therefore draws the rod 34 through the rim portion 30 and thus applies a compressive preload force to the spacer sleeves 46.

The inner sleeve 26 and the stack of trays 32 and the base member 36 disposed therewithin form a tray module which can be installed into and removed from the head section 6 of the vessel 4 as a complete unit. This arrangement allows for easy maintenance and reconfiguration of the module. For example, the number and/or spacing of the trays 32 may be easily changed by changing the spacer sleeves 46.

A top cap 50 is attached to the outer wall 22 in order to close the end of the head section 6. Specifically, the top cap 50 is bolted to the flange 24 through the flange 28 of the inner sleeve 26. The vent 18 is formed in the top cap 50.

As can be seen, the trays 32 are suspended in the head section 6 without any direct physical connection to the outer wall 22 or the inner sleeve 26. This arrangement avoids needing to weld the trays to the vessel, as typically done, and thus avoids corrosion associated with such techniques.

In use, water enters the head section 6 above the trays 32 via the water supply line 14 (not shown in FIGS. 2 and 3). The water inlet 16 may comprise a spray nozzle in order to increase surface area. Steam is introduced into the head section 6 via the holes 42. The water cascades down across the trays 32 from the top to the bottom, while the steam rises through the trays 32. The steam heats the water to the saturation temperature thereby releasing dissolved gas, such as oxygen and carbon dioxide, from the water which is then expelled from the vent 18.

The deaerated water flows down through the holes 44 and into the receiving section 8. The deaerated water may be pumped out of the receiving section 8 via the outlet 20 to provide feedwater to a boiler or for other uses. Alternatively, the receiving section 8 itself may form a steam generator (e.g. a clean steam generator) which boils the water and thereby generates steam. The steam can therefore be provided directly from the receiving section 8 to the head section 6 via the holes 42, rather than via the steam supply line 10.

It will be appreciated that the trays 32 could be suspended within the inner sleeve 26 in other manners. For example, the rods 34 could be replaced by other elongate elements, such as cables or the like. Further, rods formed by multiple discrete elements which are screwed or otherwise fastened together with the trays held between could also be used. With such an arrangement, the rod elements themselves would also serve as spacers. The trays 32 could also be suspended from the flange 28 or from the top cap 50 without the inner sleeve 26 such that they sit directly within the outer wall 22.

In other arrangements, the base member 36 may be fixed within the vessel 4 and not part of the removable module.

It will be appreciated that different forms of tray may be used instead of those described and shown.

The invention claimed is:
1. A deaerator comprising:
a vessel having a chamber defined by an outer wall; and
a tray module detachably connected to the vessel, the tray module comprising a plurality of deaerator trays which are connected to one another in a spaced relationship to form a stack which is suspended within the chamber;
wherein the trays are connected by a plurality of elongate elements which extend between and through the trays;
wherein spacers are received between adjacent trays in order to space them from one another; and
wherein the spacers formed as sleeves, the elongate elements extending through the sleeves between adjacent trays.
2. The deaerator as claimed in claim 1, wherein the plurality of trays are suspended from a flange which is supported by the outer wall.

3. The deaerator as claimed in claim 2, wherein the flange is disposed between the outer wall of the vessel and a top cap.

4. The deaerator as claimed in claim 1, wherein the elongate elements are rods.

5. The deaerator as claimed in claim 1, wherein each of the trays is a circular segment.

6. The deaerator as claimed in claim 1, wherein the tray module further comprises a base member which forms part of the stack; and
wherein the base member comprises holes for receiving steam and/or holes for expelling deaerated water.

7. The deaerator as claimed in claim 6, wherein the base member comprises an upstand and a rim extending radially from the upstand, wherein the holes comprise a plurality of holes provided on the upstand for receiving steam and a plurality of additional holes provided on the rim for expelling deaerated water.

8. The deaerator as claimed in claim 1, wherein a portion of the vessel in which the tray module is suspended forms a head section, and the vessel further comprises a receiving section which is configured to receive deaerated water from the head section.

9. The deaerator as claimed in claim 8, wherein the receiving section comprises a steam generator.

10. A deaerator comprising:
a vessel having a chamber defined by an outer wall; and
a tray module detachably connected to the vessel, the tray module comprising a plurality of deaerator trays which are connected to one another in a spaced relationship to form a stack which is suspended within the chamber;
wherein the trays are connected by a plurality of elongate elements which extend between and through the trays;
wherein spacers are received between adjacent trays in order to space them from one another; and
wherein the tray module further comprises an inner sleeve which is received by the outer wall, wherein the stack of the trays is disposed within the inner sleeve.

11. The deaerator as claimed in claim 10, wherein the inner sleeve is connected to and extends from a flange which is supported by the outer wall.

12. The deaerator as claimed claim 10, wherein there is no direct physical connection between the trays and the outer wall or the inner sleeve.

13. A deaerator comprising:
a vessel having a chamber defined by an outer wall; and
a tray module detachably connected to the vessel, the tray module comprising a plurality of deaerator trays which are connected to one another in a spaced relationship to form a stack which is suspended within the chamber;
wherein the tray module further comprises a base member which forms part of the stack; and
wherein the base member comprises an upstand and a rim extending radially from the upstand, wherein a plurality of holes are provided on the upstand for receiving steam and a plurality of additional holes are provided on the rim for expelling deaerated water.

14. The deaerator as claimed in claim 13, wherein the plurality of trays are suspended from a flange which is supported by the outer wall.

15. The deaerator as claimed in claim 14, wherein the flange is disposed between the outer wall of the vessel and a top cap.

16. The deaerator as claimed in claim 14, wherein the tray module further comprises an inner sleeve which is received by the outer wall, wherein the stack of the trays is disposed within the inner sleeve; and
wherein the inner sleeve is connected to and extends from the flange.

17. The deaerator as claimed in claim 16, wherein there is no direct physical connection between the trays and the outer wall or the inner sleeve.

18. A deaerator as claimed in claim 13, wherein a portion of the vessel in which the tray module is suspended forms a head section, and the vessel further comprises a receiving section which is configured to receive deaerated water from the head section.

19. The deaerator as claimed in claim 18, wherein the receiving section comprises a steam generator.

\* \* \* \* \*